United States Patent [19]
Clendinning et al.

[11] 3,923,729
[45] Dec. 2, 1975

[54] BIODEGRADABLE TRANSPLANTER CONTAINERS

[75] Inventors: Robert A. Clendinning, New Providence; James E. Potts, Millington; Walter D. Niegisch, Watchung, all of N.J.

[73] Assignee: Union Carbide Corporation, New York, N.Y.

[22] Filed: July 15, 1974

[21] Appl. No.: 488,470

Related U.S. Application Data

[62] Division of Ser. No. 275,975, July 28, 1972, abandoned.

[52] U.S. Cl. ............... 260/40 R; 47/37; 47/DIG. 7; 260/9; 260/16; 260/7.5; 260/33.2 R; 260/78.3 R; 260/DIG. 43; 260/857 PE; 260/858; 260/873
[51] Int. Cl.² .................... A01C 11/02; C08G 63/02
[58] Field of Search.... 260/7.5, 9, 16, 40 R, 33.2 R, 260, 78.3 R, DIG. 43, 857 PE, 858, 873; 47/37, DIG. 7

[56] References Cited
UNITED STATES PATENTS

| | | | |
|---|---|---|---|
| 1,317,721 | 10/1919 | Mooser-Schneiss | 260/7.5 |
| 2,688,209 | 9/1954 | Adams | 47/37 |
| 3,274,012 | 9/1966 | Cooper et al. | 260/9 |
| 3,301,825 | 1/1967 | Hostettler et al. | 260/9 |
| 3,314,205 | 4/1967 | Davis, Jr. | 260/9 |
| 3,361,690 | 1/1968 | Gregory | 260/9 |
| 3,554,941 | 1/1971 | Varnell | 260/9 |
| 3,632,687 | 1/1972 | Walter et al. | 260/896 |
| 3,636,956 | 1/1972 | Schneider | 260/78.3 |
| 3,647,111 | 3/1972 | Stager et al. | 220/83 |
| 3,734,979 | 5/1973 | Koleske et al. | 260/897 |
| 3,741,918 | 6/1973 | Koleske et al. | 260/8.5 |
| 3,746,670 | 7/1973 | McGuire | 260/7.5 |

OTHER PUBLICATIONS

"Polymer Preprints", Vol. 13, No. 2, pp. 629–634, Potts et al.
Chem. Tech., July 1971, pp. 409–415 Rodriquez
Applied Microbiology, Vol. 16, No. 9, pp. 900–905, Darby et al. (1968).

*Primary Examiner*—Eugene C. Rzucidlo
*Attorney, Agent, or Firm*—James J. O'Connell

[57] ABSTRACT

Shaped containers fabricated from material comprising biodegradable thermoplastic oxyalkanoyl polymers, e.g., epsilon-caprolactone polymers, and naturally occurring biodegradable product, e.g., fir bark, said containers possessing a germination medium, and optionally, a seed or seedling therein.

22 Claims, No Drawings

BIODEGRADABLE TRANSPLANTER CONTAINERS

This is a division of application Ser. No. 275,975 filed July 28, 1972, now abandoned.

This invention relates to new and useful improvements in transplanter containers.

In the seed and nursery industry, it is the practice of the horticulturist to plant seeds or seedlings in soil or conditioned material which is contained in relatively small containers, such as metal cans or clay pots, so that initial growth may be carefully controlled under greenhouse or other desirable conditions. During such growth, the root system of the plant develops and becomes established within the soil or other material in the container. The use of metal, clay or other similar types of containers is generally satisfactory during the initial growth period. A major disadvantage, however, of such containers is that the plant must be entirely removed from the container when it is to be transplanted to the field or to a larger container. Since the root system has developed within the soil or material in which growth was started, the roots are firmly embedded and intertwined with such soil and removal from the container of the plant and the soil in which the roots are established disturbs the root system and results in damage thereto.

In the regeneration of forests it is the practice of the silviculturist to employ, for the most part, bare-root planting methods. Though it is estimated that well over one billion bare-root tree seedlings are planted annually in North America, the bare-root planting method is fraught with disadvantages. A formidable obstacle to the silviculturist is the rapidity of physical deterioration of the bare-root stock. Reforestation is beset with labor problems, antiquated tools, and dated concepts of planting. In this respect the article published in the Forest Products Journal, Volume 19, No. 10 (October 1969) is worth noting. In this article, the author, John Walters, states the following, "Today forestry like other industries, is faced with a labor force that is declining not only in numbers but in its tolerance to the tedium and monotony of crude tools. Coincidental to the decline of the manual labor force, enlarged planting programs are being planned that will place an intolerable strain on labor and economic resources. As a consequence, there is an urgent need for the development and testing of planting systems adaptable to principles of total mechanization in which nursery and planting projects can be carried out without hand labor."

The silviculturist has very recently turned to experimenting with container planting methods. In this regard, new shapes and types of containers and accessory equipment for growing and planting seedlings have been devised. One method involves the mechanical metering of containerized seedlings into the terrain. The equipment utilized is a "planting gun" in which the container, in the shape of a "bullet", is placed into the planting gun, passed through the gun muzzle, and then mechanically inserted into the ground. The bullet can be fabricated from material such as polystyrene and is quite rigid in construction. To permit root egress of the seedling from such bullet to the surrounding soil after planting, the walls of the bullet are weakened by strategically located grooves, splits, and/or holes. Unfortunately, there are drawbacks to the transplanter container method briefly described above. The plastic container or bullet is not biodegradable, that is, it is not consumed or substantially consumed by the action of microorganisms such as fungi and bacteria. Not only does this non-biodegradability factor represent an ecological problem, but also interference of the root system by the container wall results in damage and stunted growth of the seedling.

Accordingly, one or more of the following objects will be achieved by the practice of the invention.

It is an object of the invention to provide a novel biodegradable transplanter container which is capable of maintaining the shape and strength of the container during the initial growth of a plant. Another object of the invention is to provide an improved transplanter container which is fabricated from materials comprising biodegradable substances, said container having sufficient mechanical strength to contain the medium in which the seed or seedling is planted and having the further characteristic of being capable of undergoing substantial biodegradation when planted in the field. Another object of the invention is to provide an improved biodegradable shaped article which contains a germination medium with/without seed or seedling therein. A further object is to provide an improved transplanter container fabricated from materials comprising biodegradable substances, said container having the capability of maintaining its shape during the initial growth period of a plant whereby the entire container and its contents can be transplanted to the field or to a larger container to eliminate the possibility of disturbing or damaging the root system. A yet further object of the invention is to provide a novel article of manufacture comprising a biodegradable thermoplastic container, a germination medium, and a seed or seedling therein, said container having sufficient integrity and strength to hold its shape during the transplanting of said article of manufacture into the ground by mechanical means. A still further object is to provide a novel biodegradable transplanter container which has sufficient strength to contain the soil in which the seed or seedling is planted, which has the capability of disintegrating when planted in the field, and which upon disintegration possesses the quality of acting as a soil conditioner whereby plant growth is encouraged and improved. A particular object is to provide an improved transplanter container constructed of materials which have the property of holding its shape in a moist and/or humid environment. These and other objects will become apparent to those skilled in the art in the light of the specification.

A broad aspect of the invention is directed to novel articles of manufacture in the form of shaped containers which are fabricated from materials comprising biodegradable substances, said containers possessing a medium to germinate and grow seed or seedling, and optionally, a seed or seedling in such medium. The container of the invention has certain characteristics which produce worthwhile and ecological advantages over prior art containers. The container can be made by the various techniques employed in the thermoplastic forming arts, e.g., compression molding, extrusion, injection molding, etc. The container, constructed of biodegradable substances described hereinafter, possesses the necessary characteristics and properties which are desirable both in the initial growth period of small plants or seedlings and in the subsequent transplantation to different environments. The integrity and strength of the container are sufficient to retain the shape of the container during the initial growth period or until the transplanting occurs, even in wet and/or moist environments. Upon transplanting, the strength characteristics of the container are maintained so that the container and plant may be handled and transplanted as a complete unit without disturbance or damage to the root system of said plant. The container and plant can be transported from the nursery and transplanted into the terrain such as by hand, aerial, or mechanical means. The container is fabricated from materials comprising biodegradable substances which are consumed by microorganisms, e.g., fungi, as evidenced by substantial loss of weight and strength properties, e.g., impact strength, tensile strength, etc., thus affording desirable root egress for the seedling.

The containers of the invention are fabricated from materials comprising biodegradable thermoplastic oxyalkanoyl polymers and naturally occurring biodegradable products. The naturally occurring biodegradable products which are suitable in the practice of the invention are derived from or are a part of plant or animal species. Strictly speaking, biodegradable materials are those which, because of their chemical structure are susceptible to being assimilated by microorganisms such as molds, fungi, and bacteria, when buried in the ground or otherwise contacted with the organisms under conditions conducive to their growth. The term "biodegradable" is often used indiscriminately to refer to various types of environmental degradation, including photodegradation. Though a polymeric material may be degraded by sunlight and oxygen this does not necessarily mean that such material will also be assimilated by microorganisms. The term "biodegradable", as used herein, is reserved for that type of degradability which is brought about by living organisms, usually microorganisms.

The naturally occurring biodegradable products which are suitable in the practice of the invention include, by way of illustrations, sugar cane residue, sugar beet residue, peat moss, sawdust, hemp, sisal, linen, corn starch, cotton, rice hulls, wheat bran, soybean meal, potato starch, corn syrup, rice flour, gelatin, barley flour, rye flour, granulated sugar, wheat flour, wood pulp, brewers yeast, vegetable gum, egg albumin, cardboard, disintegrated or shredded tree bark especially Douglas Fir bark and Pine bark, cotton seed hulls, manure, disintegrated paper stock, shredded wood, hulled and coarsely ground as well as finely ground grain, and the like. Cellulosic products represent an especially useful class of naturally occuring biodegradable products.

The thermoplastic oxyalkanoyl polymers which are contemplated as biodegradable material in the fabrication of the container possess a reduced viscosity value of at least about 0.1 and upwards to about 12, and higher. In various desirable embodiments thermoplastic oxyalkanoyl polymers which have a wide span of usefulness are those which possess a reduced viscosity value in the range of from about 0.2 to about 8. In the fabrication of transplanter containers having high utility in, for example, silvicultural and agricultural applications, the preferred thermoplastic oxyalkanoyl polymers possess a reduced viscosity value in the range of from about 0.25 to about 3. These polymers are further characterized in that they contain at least about 10 weight percent, desirably greater than about 20 weight percent, of the oxyalkanoyl unit,

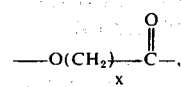

recurring therein, wherein $x$ is an integer having a value of 2, 3, and 5–7, preferably 5. In the practice of highly suitable embodiments of the invention, the thermoplastic oxyalkanoyl polymers contain at least about 50 weight percent, and preferably at least about 80 weight percent, and upwards to about 100 weight percent of the oxycaproyl unit, i.e.,

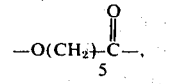

recurring therein.

The aforesaid recurring unit is interconnected through the oxy group (—O—) of one unit with a carbonyl group

of a second unit. In other words, the interconnection of such units does not involve the direct bonding of two carbonyl groups,

When the thermoplastic oxyalkanoyl polymer is a homopolymer or essentially a homopolymer, the polymer chain thereof consists essentially of interconnected recurring oxyalkanoyl units. In addition to the recurring oxyalkanoyl unit, the thermoplastic oxyalkanoyl polymer may comprise other moieties or groups therein especially those which intersperse or terminate the polymeric chain thereof as illustrated by the oxyalkylene group,

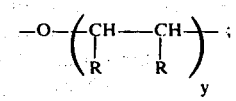

the

group; the —O(—R$_2$O)—$_x$ group; the

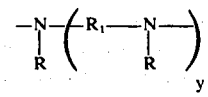

group; the

group; the urethane group,

the

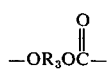

group; the

group; the biuret group;

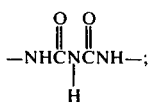

the

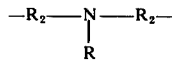

group; the divalent mono- and polyaromatic rings including fused and bridged rings; lower alkyl substituted oxyalkanoyl groups; catalyst residue; the carbonate group,

and others. With reference to the aforesaid groups or moieties, the variables R, $R_1$, $R_2$, $R_3$, and $y$ can be illustrated as follows: R represents hydrogen or lower alkyl; $R_1$ represents a divalent hydrocarbon group; $R_2$ represents a divalent aliphatic hydrocarbon group or a divalent aliphatic oxa-hydrocarbon group; $R_3$ represents a divalent aliphatic hydrocarbon group; and $y$ represents a integer which has a value of at least one.

The term "lower alkyl", as used herein, represents a monovalent aliphatic hydrocarbon group having 1 to 4 carbon atoms, e.g., methyl, ethyl, propyl, isopropyl, n-butyl, etc. The term "divalent hydrocarbon group", as used herein, includes radicals such as $C_1$–$C_{12}$alkylene, $C_2$–$C_{12}$alkylidene, and $C_6$–$C_{12}$arylene, e.g., methylene, propylene, butylene, hexamethylene, heptamethylene, cyclohexylene, phenylene, naphthylene, propylidene, butylidene, etc. The term "divalent aliphatic hydrocarbon group", as used herein, includes $C_2$–$C_{12}$alkylene and $C_2$–$C_{12}$alkylidene. The term "divalent aliphatic oxa-hydrocarbon group", as used herein, can be represented by the empirical formula, $-C_2-C_{12}$alkylene($oxyC_2-C_{12}$alkylene$-)_y$. The variable $y$, as used herein, represents an integer having a value of at least one.

As previously noted, the thermoplastic oxyalkanoyl polymers which are suitable in the practice of the invention are expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of benzene (benzene is preferred although cyclohexanone, chloroform, toluene or other common organic solvent for the polymer may be used) at 30°C.

The thermoplastic oxyalkanoyl polymers can be prepared by various methods. A general procedure involves reacting a large molar excess of the appropriate lactone, e.g., epsilon-caprolactone, zeta-enantholactone, and/or eta-caprylolactone with an organic initiator which contains two active hydrogen groups, e.g., hydroxyl, carboxyl, primary amino, secondary amino, and mixtures therof, such groups being capable of opening the lactone ring whereby it adds a linear chain (or recurring oxyalkanoyl units) to the site of the active hydrogen-containing group, at an elevated temperature, preferably in the presence of a catalyst, and for a period of time sufficient to produce the desired polymers. By carefully controlling the purity and molar ratio of lactone reactant to organic initiator, there can be produced "initiated" poly(oxyalkanoyl) polymers whose number average molecular weight can range from several hundred to above 100,000, Organic initiators which can be employed include primary diamines, secondary diamines, mixed primary-secondary diamines, aminoalcohols, diols, dicarboxylic acids, hydroxycarboxylic acids, aminocarboxylic acids, etc. Such organic initiators are voluminously illustrated in the literature, e.g., U.S. Pat. Nos. 3,169,945 and 3,427,346. Catalysts which can be employed include, for instance, stannous octanoate, tetrabutyltitanate, dibutyltin dilaurate, and the like. A temperature in the range of from about 150°C to about 250°C for periods ranging upwards to about 24 hours, and longer, are suitable.

Thermoplastic oxycaproyl polymers can also be prepared by reacting the cyclic ester, e.g., epsilon-caprolactone, and/or the corresponding hydroxyacid, e.g., 6-hydroxycaproic acid, and/or their oligomers, with a mixture comprising diol and dicarboxylic acid, using a molar excess of diol with relation to the dicarboxylic acid, or alternatively, using a molar excess of dicarboxylic acid with relation to the diol. It is highly desirable that free diol or free dicarboxylic acid not be present at the termination of the polyesterification reaction. The water of esterification which results during the reaction can be removed via conventional techniques. The diols and dicarboxylic acids which are particularly suitable include those illustrated by the formulae HO$-$($R_2$O$-)_y$H and HOOCR$_1$COOH such as ethylene glycol, propylene glycol, diethylene glycol, dipropylene glycol, 1,4-butanediol, 1,5-pentanediol, 1,6-hexanediol, 1,10-decanediol, 1,4-cyclohexanediol, succinic acid, glutaric acid, adipic acid, pimelic acid, suberic acid, azelaic acid, sebacic acid, phthalate acid, and the like.

In the absence of added organic initiator, the thermoplastic oxyalkanoyl polymers can be prepared by polymerizing a lactone reactant, e.g., betapropiolactone, delta-valerolactone, epsilon-caprolactone, etc., in the presence of anionic catalysts such as di-n-butylzinc, tri-n-butylaluminum, diethylmagnesium aluminum triisopropoxide n-butyllithium, dimethylcadmium, and the like. The reaction is desirably conducted at an elevated temperature, e.g., 100°C to 250°C, for periods of time ranging from minutes to several hours, e.g., from about 10 minutes to about 24 hours. The reaction mixture can comprise, in addition to the lactone reactant, minor quantities of other polymerizable cyclic monomers such as tetramethylene carbonate, methyl-epsilon-caprolactone, keto-dioxane, etc. The number average molecular weight of the resulting polymeric products which are produced by this exemplified "non-initiated" method are, in general, quite high. For example, products which have number average molecular weights ranging from about 10,000 to several hundred thousands can be prepared. The patent literature, e.g., U.S. Pat. Nos. 3,021,309 to 3,021,317, discusses in detail the preparation of these polymers.

Thermoplastic oxyalkanoyl polymers can also be prepared by polymerizing an admixture of a lactone, a vicinal epoxy compound, e.g., ethylene oxide, propylene oxide, butylene oxide, cyclohexene oxide, etc., and an interfacial agent such as a solid, relatively high molecular weight poly(vinyl stearate) or lauryl methacrylate/vinyl chloride copolymer (reduced viscosity in cyclohexanone of from about 0.3 to about 1.0), in the presence of an inert normally-liquid saturated aliphatic hydrocarbon vehicle such as heptane, using phosphorus pentafluoride as the catalyst therefor, and in the absence of an active hydrogen-containing organic initiator, at an elevated temperature, e.g., about 80°C, and for a period of time sufficient to produce such polymers.

Thermoplastic oxyalkanoyl polymers can also be prepared by reacting a molar excess of $C_6$–$C_9$ lactone with a polyoxyalkylene diol which has a molecular weight ranging from about 400 to about 20,000 under conditions discussed supra with reference to the "initiated" poly(oxyalkanoyl) polymers. Illustrative of the polyoxyalkylene diols which are contemplated include the poly)oxyethylene) diols, the poly(oxypropylene) diols, and the poly(oxyethyleneoxypropylene) diols. The resulting polymers can be considered, in effect, to be ABA block polymers in which the A portions represent a polyoxyalkanoyl segment or block and in which the B portion represents a polyoxyalkylene segment or block. The number average molecular weight of these ABA block polymers can range upwards to 50,000 and higher, depending on the molecular weight of the polyoxyalkylene diol reactant and the molar ratio of the lactone reactant to polyoxyalkylene diol reactant employed and consumed in the process. By using mono end-blocked polyalkylene diols such as the monoalkyl ether of polyoxyalkylene diol, the above discussed preparation results in polymers having an AB block configuration.

Oxyalkanoyl polymers which can be considered to be "graft" polymers can be prepared by the addition of $C_6$–$C_9$ lactone at the active hydrogen sites, e.g., hydroxyl or amino, which are pendant along the polymeric chain of so-called vinyl polymers. Such vinyl polymers may, for example, be obtained by the copolymerization of ethylene and vinyl acetate, followed by subsequent saponification of the acetate groups to yield polymers which are characterized by a plurality of pendant hydroxyl groups along the polymeric chain thereof. A wide host of ethylenically unsaturated monomers can be employed to prepare the vinyl polymers and include, for example, 2-hydroxyethyl acrylate, 2-hydroxy methacrylate, styrene, acrylonitrile, propylene, vinyl chloride, and the like. The choice of the ethylenically unsaturated monomers are such that the resulting polymer contains a plurality of pendant hydroxyl groups, or groups which can be converted to hydroxyl groups. The addition of the $C_6$–$C_9$-lactone at the active hydrogen site will produce "graft" polymers of number average molecular weights upwards to approximately 100,000 and higher.

The oxyalkanoyl polymers which have number average molecular weights of, for example, less than 25,000 are characterized by functional end groups. For instance, hydroxyl-terminated polymers can be prepared from a diol initiator and epsilon-caprolactone using molar ratios of lactone to initiator upwards to about 100:1. If desired, these hydroxyl-terminated polymers may be reacted with a diisocyanate, e.g., 2,4- and/or 2,6-tolylene diisocyanate, bis(4-isocyanatophenyl)methane, bis(4-isocyanatocyclohexyl)methane, etc., to extend the polymeric chain, or such hydroxylterminated polymers as well as their polyurethane extension products can be reacted with so-called "chain stoppers" such as a monocarboxylic acid or anhydride. As indicated previously, the thermoplastic oxyalkanoyl polymers which are suitable in the practice of the invention have, as its lower limit, a reduced viscosity value of at least about 0.1.

If desired, additional materials can be used in the fabrication of the container of the invention such as fibrous and non-fibrous fillers, plastic additives, plasticizers, dyes, etc. Illustrative of the foregoing materials include kaolin, bentonite, polyethylene, the butadiene/styrene rubber gum stocks, the nitrile rubber gum stocks, the aminoplasts, the polyurethanes, the wax-like and solid water-soluble ethylene oxide homopolymers and copolymers, iron oxide, clay, polystyrene, coal dust, talc, glass wool, carbon black, lamp black, silica, titanium dioxide, asbestos, vermiculite, metallic powders, mica, calcium sulfate, the polylactams, the polyureas, the dialkyl esters of phthalic acid, and the like.

The optimum composition of the container will depend, to a significant extent, upon a consideration of factors such as the thermoplastic oxyalkanoyl polymer of choice; the naturally occurring biodegradable product of choice; the concentrations of the thermoplastic oxyalkanoyl polymer and the naturally occurring biodegradable product; the presence and kind of other ingredients, e.g., plastic additives, fillers, plasticizers, dyes, and the like; the rate and degree of biodegradability which are desired for the intended use; the geometry of the container, e.g., its dimensions, shape, and design; over-all economics especially raw material and fabrication costs; and others.

The proportions of the thermoplastic oxyalkanoyl polymer and the naturally occurring biodegradable product used in the fabrication of the container can vary over a wide range. The thermoplastic oxyalkanoyl polymer as exemplified by high molecular weight epsilon-caprolactone homopolymer, unlike other plastics such as the polyethylenes and the polystyrenes, has the capability of readily accepting high loadings of the naturally occurring biodegradable product while maintaining or evidencing an increase in the stiffness or modulus of containers fabricated from such "filled" polymers. Quite obviously, too, the cost of the container is markedly reduced by the use of the relatively inexpensive naturally occurring biodegradable product. Suitable containers can also be initially fabricated from the naturally occurring biodegradable product and then coated with the thermoplastic oxyalkanoyl polymer, e.g., dipping, spraying, etc., as discussed hereinafter.

In general, containers suitable in the practice of the invention comprise from about 5 to about 95 weight percent of thermoplastic oxyalkanoyl polymer and from about 95 to about 5 weight percent of naturally occurring biodegradable product, based on the weight of the containers. In various embodiments which take into consideration the combination of favorable economics, good mechanical properties, and other factors, the container can be constructed from formulations which comprise from about 10 to 90 weight percent, suitably from about 20 to about 80 weight percent, of thermoplastic oxyalkanoyl polymer; from about 10 to about 90 weight percent, suitably from about 20 to about 80 weight percent, of naturally occurring biodegradable product; and from 0 to about 75 weight percent, suitably from 0 to 60 weight percent, of other ingredients such as plastic additive, filler, mixtures thereof, and the like.

Though biodegradability of the thermoplastic oxyalkanoyl polymer is oftentimes manifest when at least about 10 weight percent of its weight is attributable to oxyalkanoyl units, especially oxycaproyl units, it is desirable that the containers be fabricated from substances comprising thermoplastic oxyalkanoyl polymer in which at least about 20 weight percent of the weight of such polymer is in the form of oxyalkanoyl units, especially oxycaproyl units. In specific aspects of the invention it is preferred that such polymer contain at least about 50 weight percent, and preferably still at least about 80 weight percent, and upwards to about 100 weight percent of oxycaproyl units therein.

Various techniques known to the art can be used to fabricate the containers of the invention and include, for instance, compression molding, injection molding, transfer molding, extrusion, vacuum forming, blow molding, film casting, calendering, rotational molding, dipping, laminating, spraying, coating, and the like. If desired, one can employ a blend of materials in which the thermoplastic oxyalkanoyl polymer represents the continuous phase and the naturally occurring biodegradable product with/without additional ingredients such as plastic additives and fillers is dispersed therein. Other techniques or modes include the fabrication of the container from material comprising naturally occurring biodegradable product, e.g., cardboard, paper, peat moss, etc., followed by depositing a coating or layer of thermoplastic oxyalkanoyl polymer on to the surface thereof as by dipping, spraying, laminating, or coating techniques. By way of further illustrations, the container can be fabricated from plastic which is shaped into net, web, chicken-wire, or other geometric or non-geometric configuration, and in which the voids are filled and the plastic is coated with material comprising thermoplastic oxyalkanoyl polymer and naturally occurring biodegradable product as by spraying, dipping, laminating, coating, etc., operations.

Suitable equipment for fluxing a blend comprising thermoplastic oxyalkanoyl polymer and naturally occurring biodegradable product include Banbury mixers, screw extruders, two-roll or multi-roll mills, ribbon or paddle blendors, calenders, and the like. The time of blending or fluxing is not narrowly critical. The blending time should be sufficient to obtain a substantially uniform mixture.

The container of the invention can be of any size and shape capable of having utility in horticultural, silvicultural, and agricultural applications. It can be in the form of a flower pot, cone, bullet, tube, cylinder, tray, etc. It should be capable of holding the germination medium therein. In this connecton additional support or reinforcement material can be used. For instance, a container shaped in the form of a hollowed tube, opened at both extremities, may not be suitable in holding the germination medium in its interior. The drawback can be overcome by stoppering one end of such tube with suitable plugging means, if necessary.

In the practice of suitable embodiments of the invention it is desirable that the shaped container possess an integrity and mechanical strength characteristics which are sufficient for the intended purpose. If the container is to be used in mechanical transplantation methods, it is highly desirable that the container has sufficient strength properties to withstand breakdown or failure during the transplanting operation. In this respect, one can use, if desired, containers which are characterized by a modulus range of from about 10,000 psi, and lower, to about 1,000,000 psi (as determined by ASTM Method D-638). On the other hand, containers characterized by a much lower modulus can be tolerated in hand planting techniques, e.g., at least about 300 psi. It is to be understood that the aforementioned values are merely illustrative and that higher and lower values are contemplated as being within the scope of the invention.

If desired, the container of the invention can be modified to further incorporate or tailor-make additional features and advantages thereto. For example, containers fabricated from mixtures comprising biodegradable thermoplastic oxyalkanoyl polymer, naturally occurring biodegradable product, and water-soluble polymers, e.g., wax-like and solid water-soluble ethylene oxide homopolymers and copolymers, possess the capability of undergoing relatively slow dissolution or leaching in an aqueous or humid surrounding thus providing a more favorable environment for growth of fungi. In the practice of other embodiments of the invention, containers having additional utility and attractiveness can be fabricated from formulations comprising plant nutrients, stabilizers, fertilizers, pesticides, insecticides, herbicides, and the like.

The containers possess a medium to germinate and grow seed or seedlings, and optionally, the seed or seedling in such medium. Any mixture suitable for growing plant life such as farm products, flowers, shrubs, trees, grass, etc., can serve as a germination medium. The germination medium can be formed from synthetic materials, substances found in nature, or mixtures of both. A desirable germination medium comprises soil formed from disintegrated and decomposed rocks and minerals generally mixed with organic matter in various stages of decay, and having substantial porosity or pore space. The pore space will vary with the texture of the soil. The soil may comprise silt, sand, clay, stone, gravel, minerals, organic matter, etc. Conditioners and stabilizers can be added to or contained in the soil and they include, for example, gypsum, calcium chloride, limestone, vermiculite, iron sulfate, water-soluble high molecular weight polymeric electrolytes, and others. Nutrients can be added to the soil to aid plant growth and to supplement the plant-food content thereof. The more important ones include the compounds of nitrogen, phosphorous, and potassium. Trace elements such as magnesium, iron, zinc, copper, etc., have been shown to be beneficial to plant growth and can be added to the soil. Various types of fertilizers provide useful nutrients. They can range from inorganic compounds as illustrated by ammonium nitrate types to organic compounds such as the long lasting urea forms which release the nitrogen slowly.

Any type of seed or seedling capable of growing in soil is contemplated in the practice of the invention. Of special interest are tree seeds and seedlings as illustrated by the deciduous and coniferous types such as oak, ash, maple, elm, Douglas Fir, pine, spruce, cedar, etc.; shrub seedlings as illustrated by ornamental or evergreen types such as taxus, holly, juniper, etc.; plants and flowers of the various well-known varieties; and the like.

By the terms "biodegradable" and "biodegradability", as used herein, are meant that the container of the invention is capable of being consumed by microorganisms as, for example, bacteria or fungi, in an environment suitable to the growth of microorganisms such that there results a weight loss of at least approximately 20 weight percent in the biodegradable thermoplastic oxyalkanoyl polymer component used in the fabrication of the container within a period of about four years, and generally within about two years. The degree and rate of container biodegradability depend, to an extent, on the weight percent oxyalkanoyl content, especially oxycaproyl content, in the thermoplastic oxyalkanoyl polymer used in the fabrication of the container, and the presence or absence of biodegradable additives, fillers, plasticizers, etc. By way of illustration, containers fabricated from thermoplastic epsilon-caprolactone homopolymer ($I_r$ of about 0.7) and Douglas Fir bark and subjected to soil burial tests, evidence weight losses up to and exceeding 50 weight percent within one year due to container disintegration and container consumption by microorganisms.

In the illustrative Examples hereinafter disclosed, numerical references in the copolymer or blends designate parts by weight. For example, 67 ethylene/33 vinyl acetate refers to a copolymer containing 67 parts by weight of vinyl acetate chemically combined therein.

EXAMPLES 1–24

In Examples 1–24 infra, samples of commercially available high molecular weight polymers were pressed or molded into plaques from which test specimens were cut. These specimens were tested for degradation by fungi using ASTM-D-1924-63[1]. This procedure requires the placement of test specimens in or on a solid agar growth medium that is deficient only in carbon. The medium and specimens are inoculated with the test microorganisms and incubated for three weeks. Any growth which may occur is dependent on the utilization of a component of the specimen as a carbon source by the test organism. The test fungi consisted of a mixture of *Aspergillus niger*, *Aspergillus flavus*, *Chaetomium globosum*, and *Penicillium funiculosum*. Since possible complication that growth may occur as a result of the presence of additives in the polymeric specimen, it was necessary that the polymeric specimen tested be free from stabilizers, plasticizers, lubricants, and other extraneous organic substances, or that the presence of such additives be recognized. If a pure polymeric specimen showed heavy growth and concurrent loss of weight and mechanical properties this was considered good evidence of its biodegradability.

[1] ASTM-D-1924: Recommended practice for determining resistance of synthetic polymeric materials to fungi. Ann. Book of ASTM Standards, 1970, Part 24, page 593.

After various exposure times up to three weeks, and longer, the samples were examined and assigned growth ratings as shown below:

Growth Ratings:
0 = No Growth
1 = Traces (Less than 10% Covered)
2 = Light Growth (10 to 30% Covered)
3 = Medium Growth (30 to 60% Covered)
4 = Heavy Growth (60 to 100% Covered)

The pertinent data are set out in Table I below.

TABLE I

| Sample No. | Commercial Thermoplastic | Growth Rating |
|---|---|---|
| 1 | Acrylonitrile/Butadiene/Styrene Terpolymer (ABS)[a] | 0 |
| 2 | Blend of ABS and Poly(Bisphenol A Carbonate)[b] | 0 |
| 3 | Butadiene/Acrylonitrile Rubber[c] | 0 |
| 4 | 72/Styrene/28 Acrylonitrile Copolymer | 0 |
| 5 | Poly(Methyl Methacrylate)[d] | 0 |
| 6 | Poly(Ethylene Terephthalate)[e] | 0 |
| 7 | Poly(Cyclohexanedimethanol Terephthalate)[f] | 0 |
| 8 | Poly(Bisphenol A Carbonate)[g] | 0 |
| 9 | Poly(4-Methyl-1-Pentene) | 0 |
| 10 | Polyisobutylene[h] | 0 |
| 11 | Chlorosulfonated Polyethylene[i] | 0 |
| 12 | Cellulose Acetate[j] | 0 |
| 13 | Cellulose Butyrate[k] | 0 |
| 14 | Nylon-6; Nylon-6/6; Nylon-12 | 0 |
| 15 | Poly(Vinyl Butyral) | 0 |
| 16 | Polyformaldehyde[l] | 0 |
| 17 | Poly(Vinyl Ethyl Ether); $I_r$=4 | 0 |
| 18 | Poly(Vinyl Acetate); $I_r$=0.8 | 1 |
| 19 | Poly(Vinyl Acetate), 50% Hydrolyzed to Poly(Vinyl Alcohol) | 1 |
| 20 | High Density Polyethylene, 31,600 M.W. | 0 |
| 21 | High Density Polyethylene, 52,500 M.W. | 0 |
| 22 | High Density Polyethylene, 97,300 M.W. | 1 |
| 23 | Low Density Polyethylene, 21,000 M.W. | 1 |
| 24 | Low Density Polyethylene, 28,000 M.W. | 0 |

[a] Kralastic K2938 by Uniroyal, Inc.
[b] Cycoloy by Borg Warner Corp.
[c] Hycar 1002 by B. F. Goodrich Co.
[d] Lucite by E. I. duPont de Nemours & Co.
[e] Arnite by Polychem AKU-GE, Holland
[f] Kodel by Eastman Kodak Co.
[g] Lexan 101 by General Electric Co.
[h] Vistanex by I. G. Farben
[i] Hypalon (29% Cl) by E. I. duPont de Nemours & Co.
[j] Tenite (036A3719748) by Eastman Kodak Co.
[k] Tenite (233A22300H2) by Eastman Kodak Co.
[l] Celcon by Celanese Corp.

EXAMPLES 25–30

Various polymers were tested for biodegradability in the manner indicated in Examples 1–24 supra. The results are documented in Table II below.

TABLE II

| Sample No. | Polymer | Reduced Viscosity | Growth Rating |
|---|---|---|---|
| 25 | Epsilon-Caprolactone | 0.7 | 4 |

TABLE VI-continued

| Example No. | Composition of Blend | Growth (a) rating | Modulus (b) ×10³ psi | Izod (c) impact | Weight Loss 2 Months | Weight Loss 4 Months |
|---|---|---|---|---|---|---|
| 64 | 25 PCL/25 Douglas Fir Bark/ 50 EVA (i) | 4 | 69 | 0.58 | 3.2 | (l) |

FOOTNOTES TO TABLE VI
(a) Determined in accordance with ASTM method D-1924-63.
(b) Determined in accordance with ASTM Method D-638
(c) Determined in accordance with ASTM Method D-256
(d) PCL represents epsilon-caprolactone homopolymer having a reduced viscosity value of 0.7.
(e) Diethylene glycol initiated poly(epsilon-caprolactone) diol having a number average molecular weight of about 2000.
(f) Silvacon 412 manufactured by Weyerhaeuser Co.
(g) 82 Ethylene/18 Ethyl Acrylate copolymer having a melt index of 6. All melt indices herein were determined in accordance with ASTM Method D-1238 (Condition E).
(h) LDPE represents low density polyethylene
(i) 82 Ethylene/18 Vinyl Acetate copolymer having a melt index of 130.
(j) Weight loss at 3 months.
(k) Complete disintegration.
(l) Not measured.

EXAMPLE 65

The blends set out in Examples 47–64 are molded or extruded into containers designed in the shape of a "bullet" measuring approximately 5 inches in length and one inch in outside diameter (maximum for bullet). The wall of the bullet is about 1/16 inch in thickness and is weakened by a slit 1/16 inch wide that extends longitudinally from the rim to a hole near the point of the bullet. The hole is about ¼ inch wide and about ½ inch long. The containers are filled with a mixture containing equal parts of garden soil, Michigan peat moss, and builders sand, and seeded with Douglas Fir. Within the confines of a greenhouse, the containers are then inserted into garden soil enriched with plant nutrients and conditioners. The watering schedule is predetermined and takes into consideration the container size, climate, and tree species. After periods of six months and 12 months, normal root structure and normal growth of the tree seedlings are observed. Visual examination of the containers shows substantial disintegration.

EXAMPLES 66–67

Poly(beta-propiolactone) and poly(deltavalerolactone) were tested for biodegradability in the manner indicated in Examples 1–24 supra. The results are noted in Table VII below.

TABLE VII

| Sample No. | Polymer | Reduced Viscosity | Growth Rating (a) |
|---|---|---|---|
| 66 | Beta-Propiolactone Homopolymer | 1.36 (b) | 4 |
| 67 | Delta-Valerolactone Homopolymer | 0.48 | 4 |

(a) Determined in accordance with ASTM Method D-1924-63.
(b) Determined 0.2 gram/100cc chloroform.

EXAMPLES 68–69

Thermoplastic beta-propiolactone homopolymer ($I_r$ of 1.36; 0.2 gm/100cc. of chloroform) and deltavalerolactone homopolymer ($I_r$ of 0.48) are tested for biodegradability (ASTM Method D–1924–63). The physical properties of the tested samples are measured by a modified ASTM D882–67 (Method A) procedure using an Instron Tensile Tester. In this modification a one inch specimen is used and stretched at a rate of 0.2 inch per minute to a one percent stretch to obtain the modulus; the same specimen is then stretched at a rate of 2 inches per minute to obtain the stress-strain curve. The pertinent data are shown in Table VIII below.

TABLE VIII

| Sample No. | Polymer | Growth Rating | Modulus, psi | Tensile Strength, psi | Elongation at Break, % |
|---|---|---|---|---|---|
| 68 | Delta-Valerolactone Homopolymer | 4 | 67,000 | 1,400 | 3.0 |
| 69 | Beta-Propiolactone Homopolymer | 4 | 161,000 | 1,000 | 0.6 |

We claim:

1. An article of manufacture which comprises: (a) a biodegradable container fabricated from a mixture of substances comprising (i) from about 5 to about 95 weight percent of biodegradable thermoplastic oxyalkanoyl polymer, said polymer having a reduced viscosity value of at least about 0.1 and upwards to about 12 and being further characterized in that at least about 10 weight percent of said thermoplastic oxyalkanoyl polymer is attributable to recurring oxyalkanoyl units of the formula

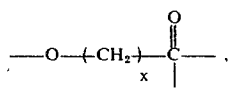

wherein $x$ is an integer having a value of 2 to 7, with the proviso that $x$ does not equal 3; (ii) from about 5 to about 95 weight percent of naturally occurring biodegradable product, based on the weight of said container; and (iii) >0 to about 75 weight percent of ingredients of the group consisting of plastic additives, fillers, and mixtures thereof and (b) a medium to germinate and grow seeds or seedlings in said container.

2. The article of manufacture of claim 1 wherein said recurring oxyalkanoyl units have the formula

TABLE II-continued

| Sample No. | Polymer | Reduced Viscosity | Growth Rating |
|---|---|---|---|
| 26 | Homopolymer Epsilon-Caprolactone Homopolymer | 0.3 | 4 |
| 27 | Pivalolactone Homopolymer | 0.1 | 0 |
| 28 | Poly(Ethylene Terephthalate) | high | 0 |
| 29 | Poly(Cyclohexanedimethanol Terephthalate) | high | 0 |
| 30 | Thermoplastic Polyoxycaproyl Polyurethane[a] | high | 4 |

[a] Reaction of diethylene glycol initiated poly(epsilon-caprolactone) diol of 2000 molecular weight with bis(4-isocyanatophenyl)methane using an NCO/OH ratio equal to one.

EXAMPLES 31–34

Four normally-solid thermoplastic oxycaproyl graft polymers prepared by reacting epsilon-caprolactone with styrene/2-hydroxyethyl methacrylate copolymer were tested for biodegradability in the manner set out in Examples 1–24 supra. The results are recorded in Table III below.

TABLE III

| Example No. | Graft Polymer[a] | Reduced Viscosity | Growth Rating |
|---|---|---|---|
| 31 | 22.5 S/0.5 HM/77 CL | 0.7 | 4 |
| 32 | 67 S/1.0 HM/32 CL | 0.9 | 4 |
| 33 | 78 S/1.0 HM/21 CL | 0.8 | 2 |
| 34 | 89 S/3.0 HM/8 CL | 0.6 | 1 |

[a] The notation S/HM/CL for the graft polymer represents styrene/2-hydroxyethyl methacrylate/epsilon-caprolactone.

EXAMPLES 35–36

Two normally-solid thermoplastic oxycaproyl graft polymers prepared by reacting epsilon-caprolactone with hydrolyzed ethylene/vinyl acetate copolymer were tested for biodegradability in the manner set out in Examples 1–24 supra. The results are noted in Table IV below.

TABLE IV

| Example No. | Graft Polymer | Growth Rating |
|---|---|---|
| 35 | 18 Ethylene/6 Vinyl Alcohol/76 CL[1] | 4 |
| 36 | 36 Ethylene/12 Vinyl Alcohol/52 CL[1] | 4 |

[1] "CL" represents epsilon-caprolactone.

EXAMPLES 37–46

Several relatively low molecular weight thermoplastic copolymers of ethylene and different vegetable oils were tested for biodegradability in the manner set out in Examples 1–24 supra. These copolymers were carefully purified before testing to remove unreacted vegetable oil. The pertinent data are noted in Table V below.

TABLE V

| Sample No. | Ethylene/Vegetable Oil Copolymer | Growth Rating |
|---|---|---|
| 37 | 74 Ethylene/26 Castor Oil | 0 |
| 38 | 72 Ethylene/28 Linseed Oil | 0 |
| 39 | 73 Ethylene/27 Safflower Oil | 0 |
| 40 | 73 Ethylene/27 Soybean Oil | 0 |
| 41 | 59 Ethylene/41 Neat Foot Oil | 0 |
| 42 | 80 Ethylene/20 Peanut Oil | 0 |
| 43 | 81 Ethylene/19 Rapeseed Oil | 0 |
| 44 | 84 Ethylene/16 Olive Oil | 0 |
| 45 | 82 Ethylene/18 Corn Oil | 0 |
| 46 | 91 Ethylene/9 Oleic Acid | 0 |

EXAMPLES 47–64

In Examples 47–64 various blends of epsilon-caprolactone homopolymer designated as PCL for convenience, reduced viscosity ($I_r$) of 0.7, and other substances were formed by fluxing on a two-roll mill for periods of time ranging from 5 to 20 minutes at temperatures upwards of about 75°C. depending on the softening point of the components comprising the blend. Plaques measuring about 6 inch × 6 inch × 0.04 inch from the blend were then formed via compression molding techniques. Strips measuring approximately 1 inch × 2 inch × 0.04 inch were cut from the plaques. Various strips were buried in a mixture of equal parts of New Jersey garden soil, Michigan peat moss, and builders sand. After two months the strips were removed and measured for weight loss. Various strips were also tested for degradation by fungi using ASTM Method D–1924–63. The pertinent data are noted in Table VI below.

TABLE VI

| Example No. | Composition of Blend | Growth (a) rating | Modulus (b) ×10³ psi | Izod (c) impact | Weight Loss 2 Months | Weight Loss 4 Months |
|---|---|---|---|---|---|---|
| 47 | 80 PCL (d) / 120 Shredded Paper | 4 | 115 | 0.64 | 6.3 | 20 |
| 48 | 60 PCL/20 Hydroxypropylcellulose/20 PCP 2000 (e) | 4 | 46 | (I) | 12.9 | 27 |
| 49 | 80 PCL/20 Rise Hulls | 4 | 71 | 0.62 | 23.1 | 40 |
| 50 | 80 PCL/20 Corn Starch | 4 | 91 | 0.42 | 6.2 | 27 |
| 51 | 80 PCL/20 Corn Syrup | 4 | 78 | 0.63 | 15.5 | 35 |
| 52 | 60 PCL/40 Urea | 4 | 97 | 0.3 | 41.2 | 46 |
| 53 | 80 PCL/20 Peat Moss | 4 | 98 | (I) | 2.1 | 7 |
| 54 | 80 PCL/20 Soya Bean Powder | 4 | 76 | 0.52 | 19.6 | (k) |
| 55 | 80 PCL/20 Brewer Yeast | 4 | 106 | 0.58 | 40.4 | (k) |
| 56 | 60 PCL/40 Hydroxypropylcellulose | 4 | 37 | 0.63 | 36.7 | 39 |
| 57 | 60 PCL/40 Woodflower | 4 | 205 | 0.44 | 4.1 | (I) |
| 58 | 60 PCL/40 Douglas Fir Bark (f) | 4 | 201 | 0.69 | 6.3 | (I) |
| 59 | 80 PCL/20 Granulated Sugar | 4 | 80 | (I) | 17.3 | 28 |
| 60 | 80 PCL/20 Egg Albumin | 4 | 86 | (I) | 11.4 | 27 (j) |
| 61 | 80 PCL/20 Urea | 4 | 76 | 0.52 | 34.9 | 36 |
| 62 | 50 PCL/25 Douglas Fir Bark/25 EEA (g) | 4 | 60 | 0.72 | 6.2 | (I) |
| 63 | 25 PCL/50 Douglas Fir Bark/25 LDPE (h) | 4 | 73 | 0.54 | 2.7 | (I) |

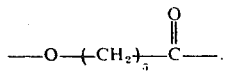

3. The article of manufacture of claim 2 wherein said biodegradable thermoplastic oxyalkanoyl polymer has a reduced viscosity value of at least about 0.2 to about 8 and is further characterized in that at least about 20 weight percent of said polymer is attributable to the recurring oxyalkanoyl unit shown therein.

4. The article of manufacture of claim 3 wherein at least about 50 weight percent of said polymer is attributable to recurring oxycaproyl units.

5. The article of manufacture of claim 4 wherein at least about 80 to about 100 weight percent of said polymer is attributable to recurring oxycaproyl units.

6. The article of manufacture of claim 4 wherein said polymer has a reduced viscosity value of at least about 0.25 to about 3.

7. The article of manufacture of claim 6 wherein said germination medium contains a seed or seedling therein.

8. The article of manufacture of claim 4 wherein said biodegradable container is fabricated from a mixture of substances comprising (i) from about 10 to about 90 weight percent of biodegradable thermoplastic oxyalkanoyl polymer, (ii) from about 10 to about 90 weight percent of naturally occurring biodegradable product, and (iii) from >0 to about 75 weight percent of ingredients of the group consisting of plastic additives, fillers, and mixtures thereof.

9. The article of manufacture of claim 4 wherein said biodegradable container is fabricated from a mixture of substances comprising (i) from about 20 to about 80 weight percent of biodegradable thermoplastic oxyalkanoyl polymer, (ii) from about 20 to about 80 weight percent of naturally occurring biodegradable product, and (iii) from >0 to about 60 weight percent of ingredients of the group consisting of plastic additives, fillers, and mixtures thereof.

10. The article of manufacture of claim 1 wherein said naturally occurring biodegradable product is a cellulosic product.

11. The article of manufacture of claim 1 wherein said naturally occurring biodegradable product is brewer's yeast.

12. The article of manufacture of claim 1 wherein said naturally occurring biodegradable product is urea.

13. The article of manufacture of claim 1 wherein said naturally occurring biodegradable product is rice hulls.

14. The article of manufacture of claim 1 wherein said naturally occurring biodegradable product is cotton seed hulls.

15. The article of manufacture of claim 1 wherein said naturally occurring biodegradable product is soya bean powder.

16. An article of manufacture which comprises: (a) a biodegradable container fabricated from a mixture of substances comprising (i) from about 5 to about 95 weight percent of biodegradable thermoplastic oxyalkanoyl polymer, said polymer having a reduced viscosity value of at least about 0.1 and upwards to about 12 and being further characterized in that at least about 10 weight percent of said thermoplastic oxyalkanoyl polymer is attributable to recurring oxyalkanoyl units of the formula

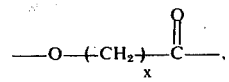

wherein $x$ is an integer having a value of 2 to 7, with the proviso that $x$ does not equal 3; (ii) from about 5 to about 95 weight percent of soyabean powder; and (iii) >0 to about 75 weight percent of polyethylene, based on the weight of said container; and (b) a medium to germinate and grow seeds or seedlings in said container.

17. The article of manufacture of claim 16 wherein said recurring oxyalkanoyl units have the formula

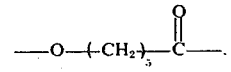

18. The article of manufacture of claim 17 wherein said biodegradable thermoplastic oxyalkanoyl polymer has a reduced viscosity value of at least about 0.2 to about 8 and is further characterized in that at least about 20 weight percent of said polymer is attributable to the recurring oxyalkanoyl unit shown therein.

19. The article of manufacture of claim 18 wherein at least about 50 weight percent of said polymer is attributable to recurring oxycaproyl units.

20. The article of manufacture of claim 19 wherein at least about 80 to about 100 weight percent of said polymer is attributable to recurring oxycaproyl units.

21. The article of manufacture of claim 19 wherein said polymer has a reduced viscosity value of at least about 0.25 to about 3.

22. The article of manufacture of claim 21 wherein said germination medium contains a seed or seedling therein.

* * * * *

UNITED STATES PATENT OFFICE
CERTIFICATE OF CORRECTION

Patent No. 3,923,729          Dated December 2, 1975

Inventor(s) Robert A. Clendinning et al

It is certified that error appears in the above-identified patent and that said Letters Patent are hereby corrected as shown below:

Column 3, line 51, "occuring" should read --occurring--.

Column 5, line 53, "a integer" should read --an integer--.

Column 6, line 26, "therof" should read --thereof--.

Column 7, lines 7-8, "diethylmagnesium aluminum triisopropoxide" should read --diethylmagnesium, aluminum triisopropoxide,--.

Column 7, line 47, "poly)" should read --poly(--.

Column 10, line 5, "blendors" should read --blenders--.

Column 10, line 18, "The" should read --This--.

Column 12, line 30, "72/" should read --72--.

Column 13, in Table VI, re Example 49, "Rise" should read --Rice--.

Column 16, line 56, The formula should read

Signed and Sealed this

Thirty-first Day of August 1976

[SEAL]

Attest:

RUTH C. MASON
Attesting Officer

C. MARSHALL DANN
Commissioner of Patents and Trademarks